(12) United States Patent
Nakata

(10) Patent No.: US 8,610,931 B2
(45) Date of Patent: Dec. 17, 2013

(54) INFORMATION PROCESSING APPARATUS, INFORMATION PROCESSING METHOD, AND STORAGE MEDIUM

(75) Inventor: Hiroaki Nakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 13/007,362

(22) Filed: Jan. 14, 2011

(65) Prior Publication Data

US 2011/0176172 A1    Jul. 21, 2011

(30) Foreign Application Priority Data

Jan. 21, 2010  (JP) ................................. 2010-011400

(51) Int. Cl.
*G06F 15/00*    (2006.01)

(52) U.S. Cl.
USPC ........................... 358/1.15; 358/1.18; 358/1.9

(58) Field of Classification Search
None
See application file for complete search history.

(56) References Cited

U.S. PATENT DOCUMENTS

| | | | | |
|---|---|---|---|---|
| 5,444,549 A | * | 8/1995 | Kondo | 358/444 |
| 5,539,529 A | * | 7/1996 | Merchant | 358/400 |
| 6,278,526 B1 | * | 8/2001 | Kurozasa | 358/1.15 |
| 6,415,065 B1 | * | 7/2002 | Miyake | 382/300 |
| 6,417,931 B2 | * | 7/2002 | Mori et al. | 358/1.15 |
| 6,567,180 B1 | * | 5/2003 | Kageyama et al. | 358/1.15 |
| 6,580,521 B1 | * | 6/2003 | Nishikawa et al. | 358/1.18 |
| 7,046,385 B2 | * | 5/2006 | Mori et al. | 358/1.15 |
| 7,142,327 B2 | * | 11/2006 | Kujirai | 358/1.18 |
| 7,184,167 B1 | * | 2/2007 | Ito et al. | 358/1.18 |
| 7,233,411 B2 | * | 6/2007 | Kuroda | 358/1.18 |
| 7,248,386 B2 | * | 7/2007 | Nishi | 358/1.2 |
| 7,528,988 B2 | * | 5/2009 | Agehama et al. | 358/1.9 |
| 7,613,413 B2 | * | 11/2009 | Asada | 399/83 |
| 7,692,808 B2 | * | 4/2010 | Takahashi | 358/1.15 |
| 7,830,543 B2 | * | 11/2010 | Maki | 358/1.18 |
| 8,018,618 B2 | * | 9/2011 | Ishibashi | 358/1.18 |
| 8,441,676 B2 | * | 5/2013 | Yamanakajima | 358/1.18 |
| 2002/0001098 A1 | * | 1/2002 | Moriyama et al. | 358/1.15 |
| 2002/0080405 A1 | * | 6/2002 | Kuroda | 358/1.18 |
| 2004/0218218 A1 | * | 11/2004 | De Bie | 358/1.18 |
| 2004/0263907 A1 | * | 12/2004 | Hiraki | 358/1.18 |
| 2007/0070422 A1 | * | 3/2007 | Kakutani | 358/3.01 |
| 2008/0002214 A1 | * | 1/2008 | Xu | 358/1.1 |
| 2010/0073693 A1 | * | 3/2010 | Lee et al. | 358/1.2 |

FOREIGN PATENT DOCUMENTS

JP    2002-112016 A    4/2002

* cited by examiner

*Primary Examiner* — Steven Kau
*Assistant Examiner* — Ashish K Thomas
(74) *Attorney, Agent, or Firm* — Canon USA Inc. IP Division

(57) ABSTRACT

An information processing apparatus includes a generation unit configured to determine, when a user inputs the number of images to be laid out on one side of a print sheet and an image magnification rate with an input operation via an input screen, an image size based on an image reduction rate for laying out the input number of images on the print sheet and the input image magnification rate, and generate print data for laying out images having the determined size on one side of the print sheet.

5 Claims, 18 Drawing Sheets

205

206

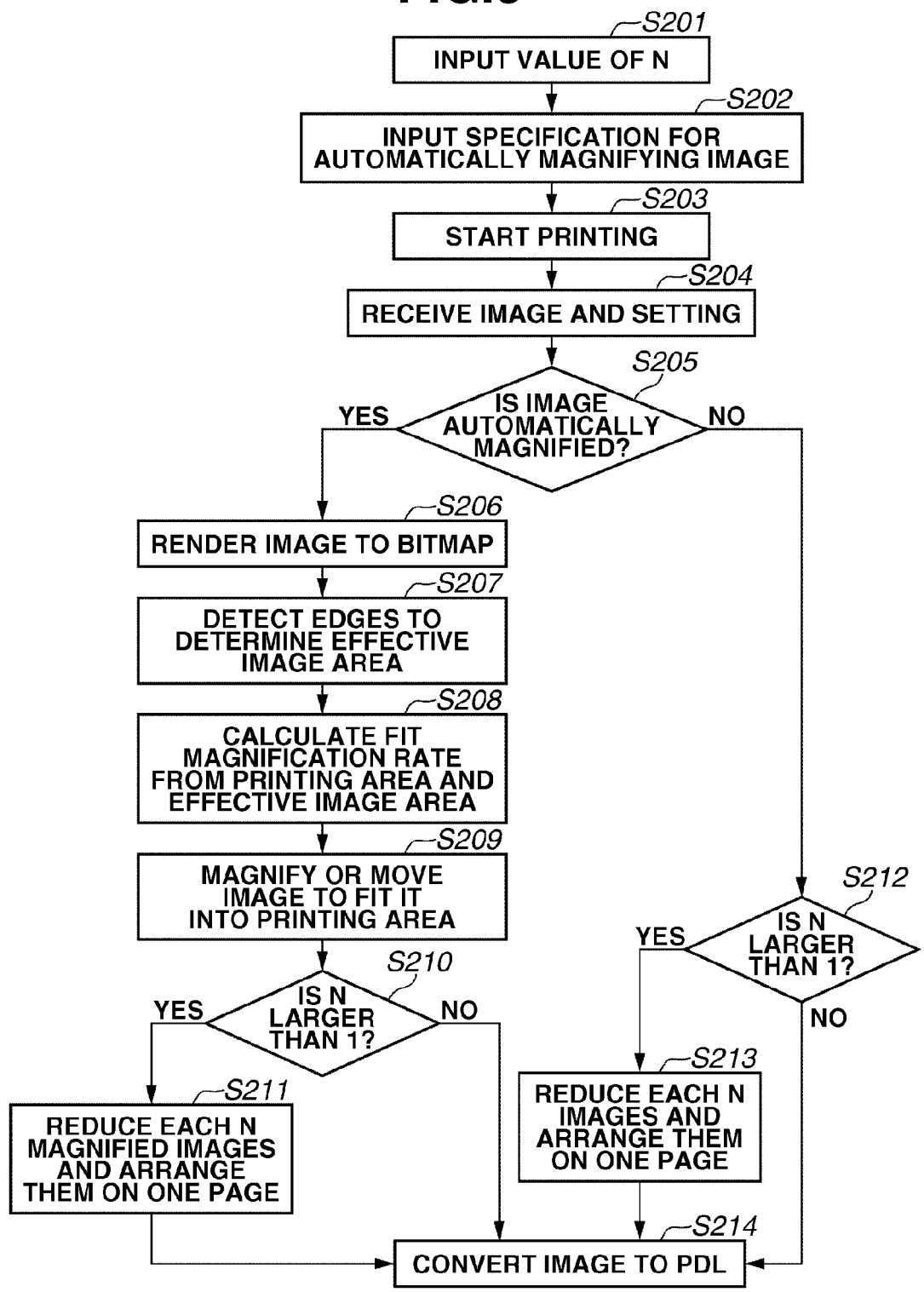

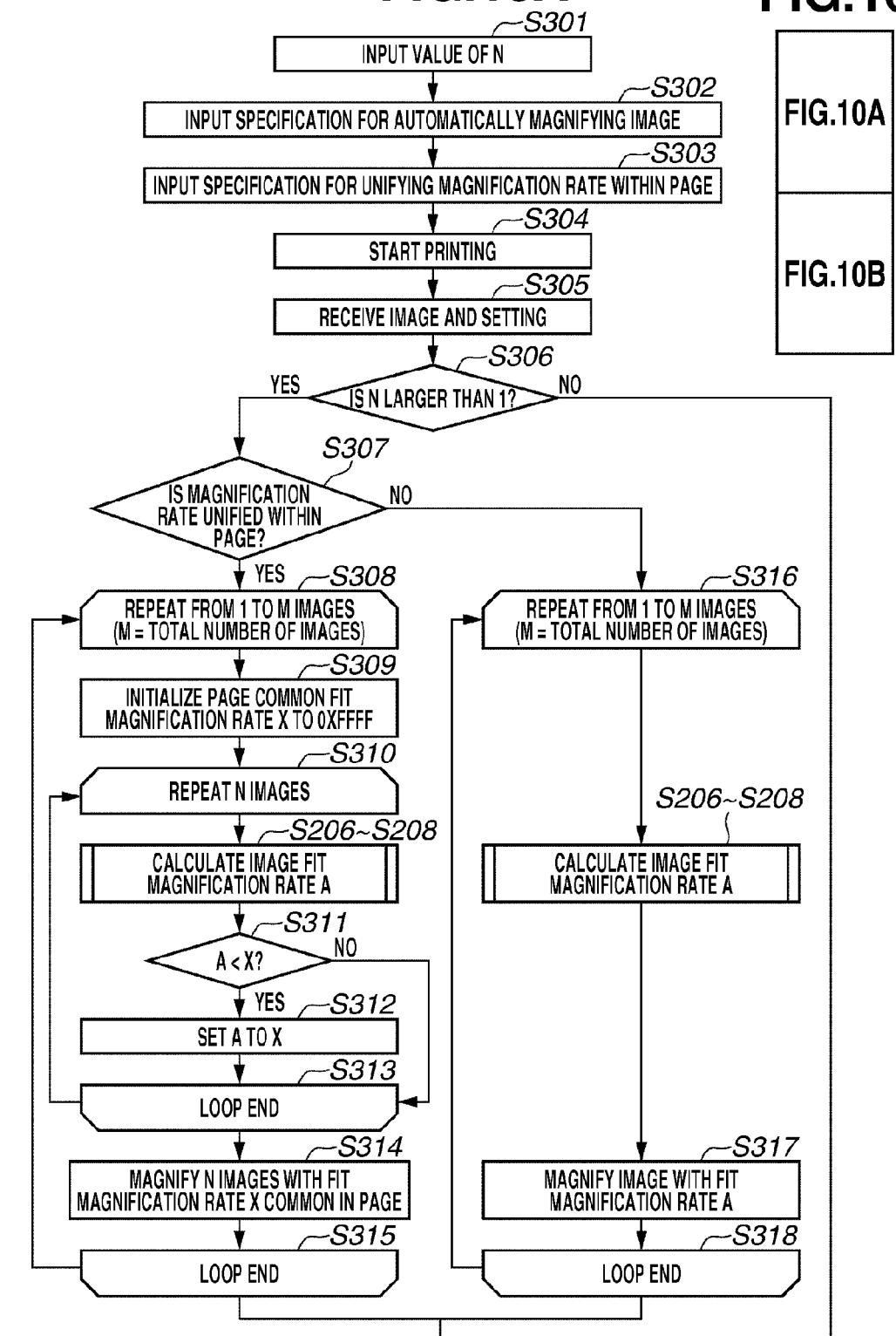

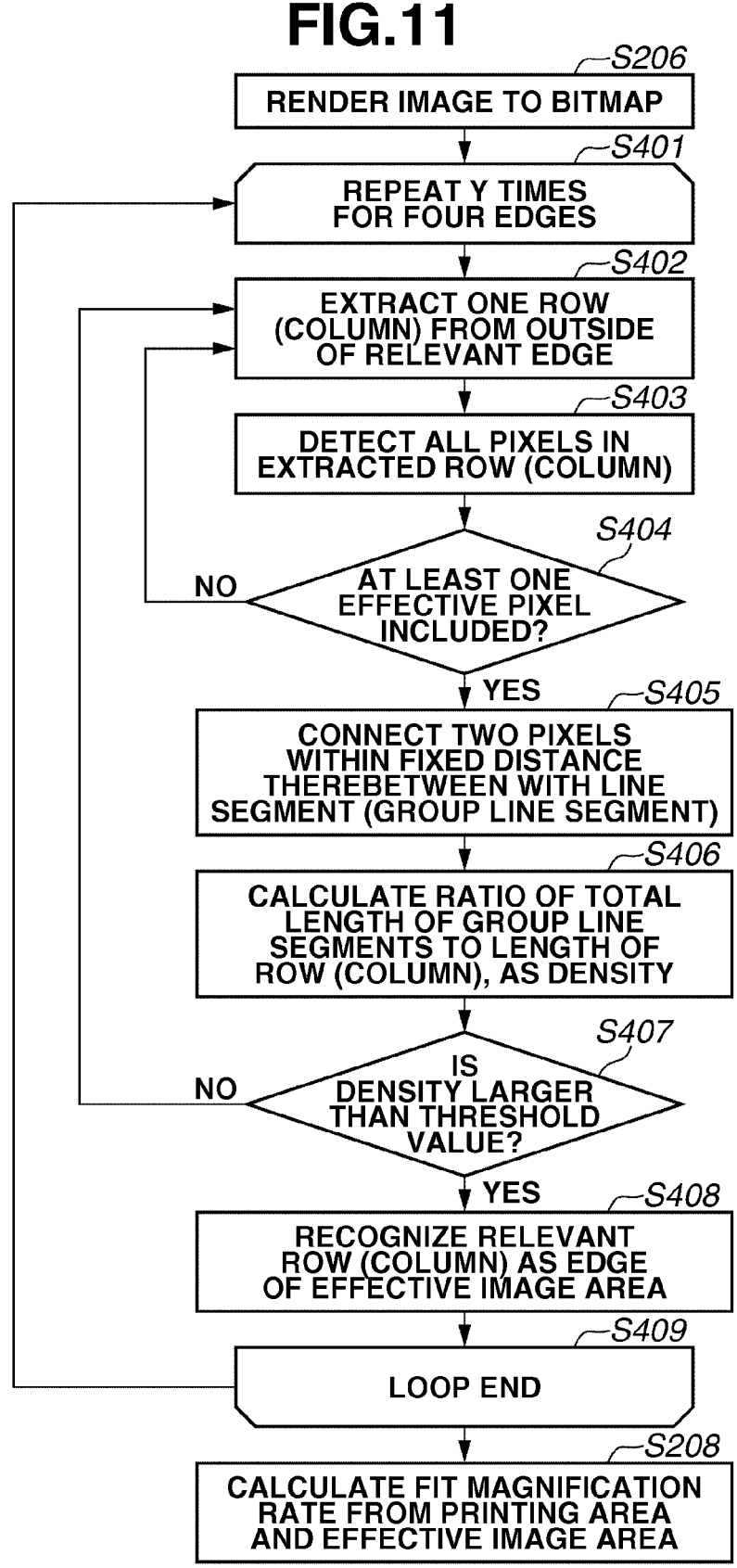

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium.

2. Description of the Related Art

With recently increased consciousness in companies toward environmental preservation, printing a document with reduced layout (hereinafter referred to as N-up) for laying out a plurality of (N) reduced pages on one side of a print sheet has been recommended.

However, a user hesitates to use 4- or 6-up printing having a high effectiveness of paper saving and tends to use 2-up printing at most.

This is because laying out four or six reduced pages on one sheet results in small text sizes making a document hard to read.

To solve this problem, for example, an image forming apparatus discussed in Japanese Patent Application Laid-Open No. 2002-112016 determines a value of N for N-up printing or selects a sheet size larger than a document size depending on point sizes of text included in the document. While Japanese Patent Application Laid-Open No. 2002-112016 discusses processing for solving the problem of small text sizes, when the document includes text of small point sizes, a large sheet size is used resulting in reduced effectiveness of paper saving.

Further, since the value of N for N-up printing is dynamically determined, a feeling of unified print layout may be often lost from the entire document.

Further, no particular considerations are made on non-text data, i.e., graphic data and image data.

SUMMARY OF THE INVENTION

The present invention is directed to providing an N-up printing function for making a document easy to read.

According to the present invention, an information processing apparatus for generating a print job based on a page image includes: an input unit configured to input the number of pages to be laid out on one side of a print sheet; a determination unit configured to determine a printing area where each page image is to be laid out based on the number of pages input by the input unit; an identification unit configured to identify an image area excluding margins from the page image; and a magnification unit configured to magnify the image area so that it may not exceed the printing area based on the image area identified by the identification unit and the printing area determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flow chart illustrating exemplary N-up print processing with an image fitted into a printing area.

FIG. 11 is a flow chart illustrating exemplary processing for determining an edge of the effective image area by recognizing a header and footer as a margin.

DESCRIPTION OF THE EMBODIMENTS

Various exemplary embodiments, features, and aspects of the invention will be described in detail below with reference to the drawings.

Figure 1:
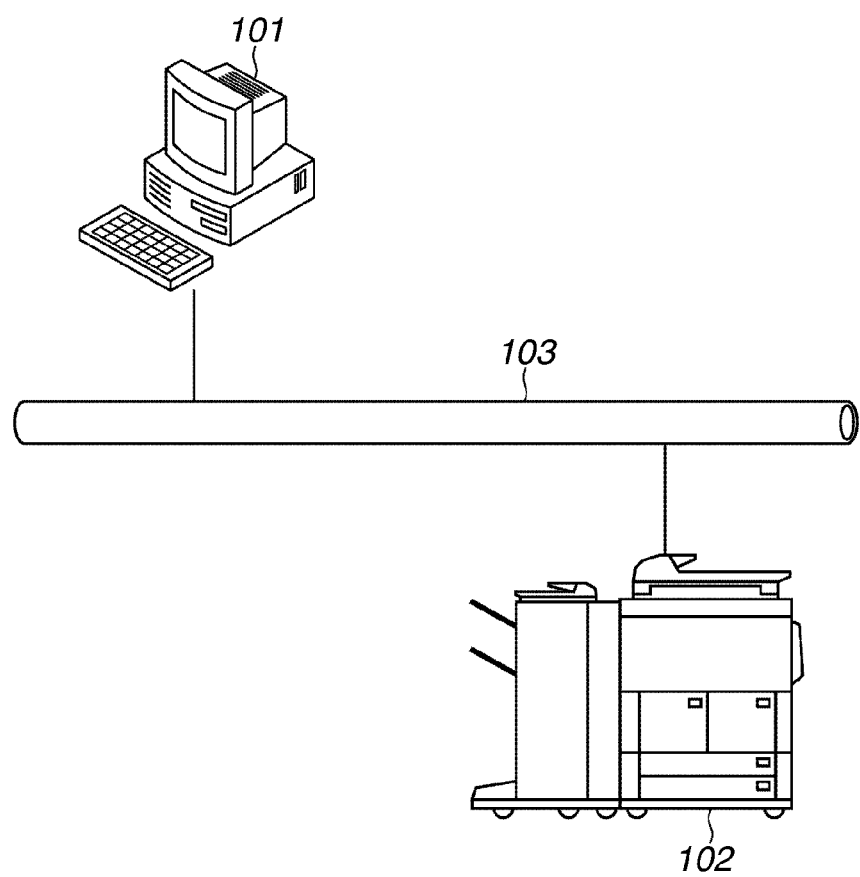
FIG. 1 illustrates an exemplary schematic configuration of a system.

FIG. 1 illustrates an exemplary schematic configuration of a system.

This system includes a host computer 101 which is an exemplary information processing apparatus, and an output device 102 which prints print data received from the host computer 101.

The host computer 101 and the output device 102 are connected via a network 104.

Figure 2:
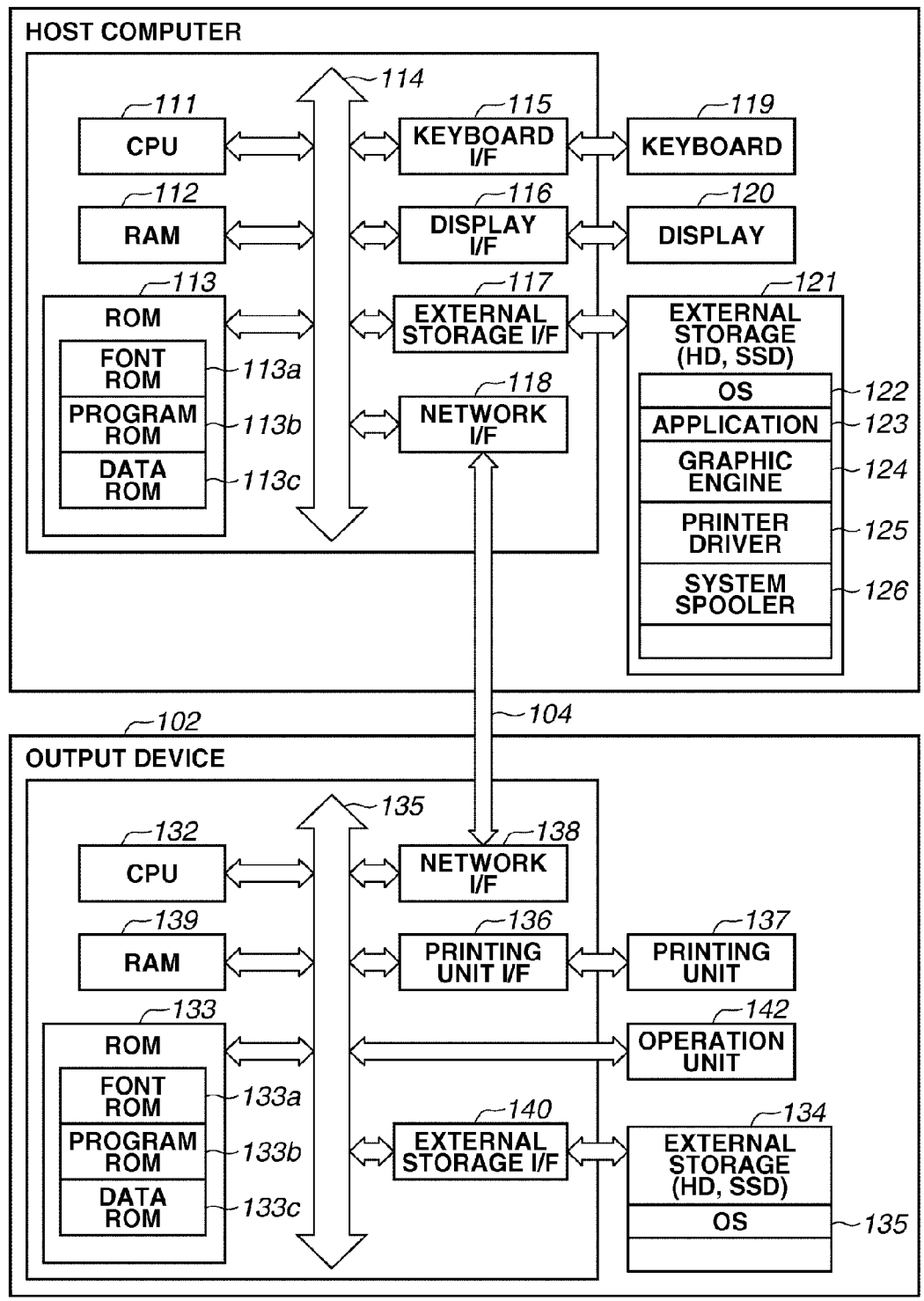
FIG. 2 illustrates an exemplary hardware configuration of a host computer and an output device.

FIG. 2 illustrates an exemplary hardware configuration of the host computer 101 and the output device 102.

In the host computer 101 which is an ordinary personal computer, a central processing unit (CPU) 111 totally controls each device connected to a system bus 114 according to a program stored in a random access memory (RAM) 112.

The RAM 112 serves as a main memory and work area for the CPU 111.

A read-only memory (ROM) 113 is partitioned into a font ROM 113a for storing various fonts, a program ROM 113b for storing a boot program, BIOS, etc., and a data ROM 113c for storing various data. A keyboard controller interface (I/F) 115 controls a key input signal from a keyboard 119 or a pointing device such as a mouse (not illustrated).

A display I/F 116 controls display on a display 120.

An external storage I/F 117 controls access to an external storage 121 such as a hard disk (HD) and a solid state disk (SSD).

The external storage 121 stores an operating system program (hereinafter referred to as OS) 122, an application 123, a graphic engine 124, a printer driver 125, a system spooler 126, and user files and editing files (not illustrated), etc. The external storage 121 serves as, for example, a computer-readable storage medium.

A network I/F 118 is connected with the output device 102 via the network 104 to control communication between the host computer 101 and the output device 102.

A configuration of the output device 102 which is an electrophotographic digital multifunction peripheral will be described below.

A CPU 132 controls overall operation of the output device 102. A RAM 139 serves as a main memory and work area for the CPU 132 and is also used as an output information loading area and environmental data storing area.

The RAM 139 includes a non-volatile RAM (NVRAM) area to enable memory expansion by using an option RAM connected to an expansion port (not illustrated).

A ROM 133 includes a font ROM 133a for storing various fonts, a program ROM 133b for storing a control program executed by the CPU 132, and a data ROM 133c for storing various data.

A network I/F 138 transmits and receives data to/from the host computer 101.

A printing unit I/F 136 controls an interface with a printing unit 137 which is a printer engine.

An external storage I/F 140 controls access to an external storage 134. The external storage I/F 140 includes a hard disk (HD), a solid state disk (SSD), etc. connected as an option. The external storage 134 stores font data, an emulation program, form data, and so on.

When the external storage 134 such as a hard disk is not connected, information used by the host computer 101 will be stored in the data ROM 133c of the ROM 133.

The number of external memories 134 is not limited to one. For example, it may be possible to connect a plurality of external memories storing option font cards in addition to built-in fonts and a program for interpreting printer control languages of different language systems. An operation unit 142 is provided with an operation panel for receiving user operations. The operation panel includes operation switches and LED indicators (not illustrated) arranged thereon.

The operation unit 142 may include a NVRAM (not illustrated) for storing printer mode setting information from the operation panel.

The CPU 132 outputs to the printing unit 137 an image signal as output information via the printing unit I/F 136 based on the control program stored in the program ROM 133b of the ROM 133.

The CPU 132 can communicate with the host computer 101 via the network I/F 138, i.e., receive print data from the host computer 101 and notify information in the output device 102 to the host computer 101.

Figure 3:
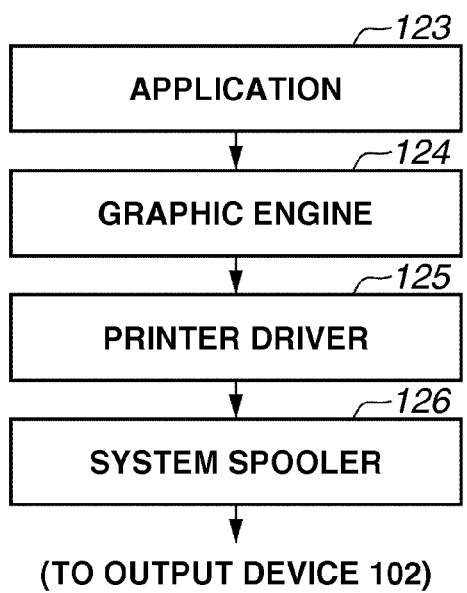
FIG. 3 illustrates a configuration of program modules relevant to print processing.

FIG. 3 illustrates a configuration of program modules relevant to print processing.

As a typical example, a configuration of modules of a printing system in Windows (registered trademark) operating system and a flow of overall processing by these modules will be described below.

The application 123, the graphic engine 124, the printer driver 125, and the system spooler 126 are stored as files in the external storage 121.

These modules are loaded into the RAM 112 by an OS 122 and other modules performing print processing, and then executed by the CPU 111. Descriptions will be made below as if processing is executed by the application 123, the graphic engine 124, the printer driver 125, and the system spooler 126, instead of the CPU 111.

Additional application 123 and printer driver 125 can be stored in the external storage 121 via a compact disk ROM (CD-ROM) (not illustrated) or the network I/F 138.

When printing a document on the output device 102 from the application 123, the application 123 outputs (draws) data by using the graphic engine 124.

The application 123 receives a user setting for setting the printer driver 125 (provided for each printer) as an output destination.

If necessary, the application 123 also receives in advance a print setting regarding print output.

The application 123 displays a user interface included therein to enable the user to input a setting value therethrough, and displays a user interface included in the printer driver 125 to enable the user to input a setting value therethrough. The user interface included in the printer driver 125 is, for example, an input screen.

When the application 123 receives a print start command from the user, the graphic engine 124 receives a series of instructions of the graphics device interface (GDI) function from the application 123, converts them into a series of instructions of the device driver interface (DDI) function, and outputs the converted instructions to the printer driver 125.

Upon reception of the instructions of the DDI function from the graphic engine 124, the printer driver 125 converts the instructions of the DDI function into page description language (PDL) data which is a control command that can be recognized by the output device 102.

Since a series of instructions of the DDI function input into the printer driver 125 can be recognized as a type of image data, data input by the printer driver 125 is hereinafter referred to as input image or simply as image.

The PDL data (print data) converted from the input image is output to the output device 102 via the system spooler 126, the network I/F 138, and the network 104.

Processing according to the first exemplary embodiment will be described below.

Figure 4A:
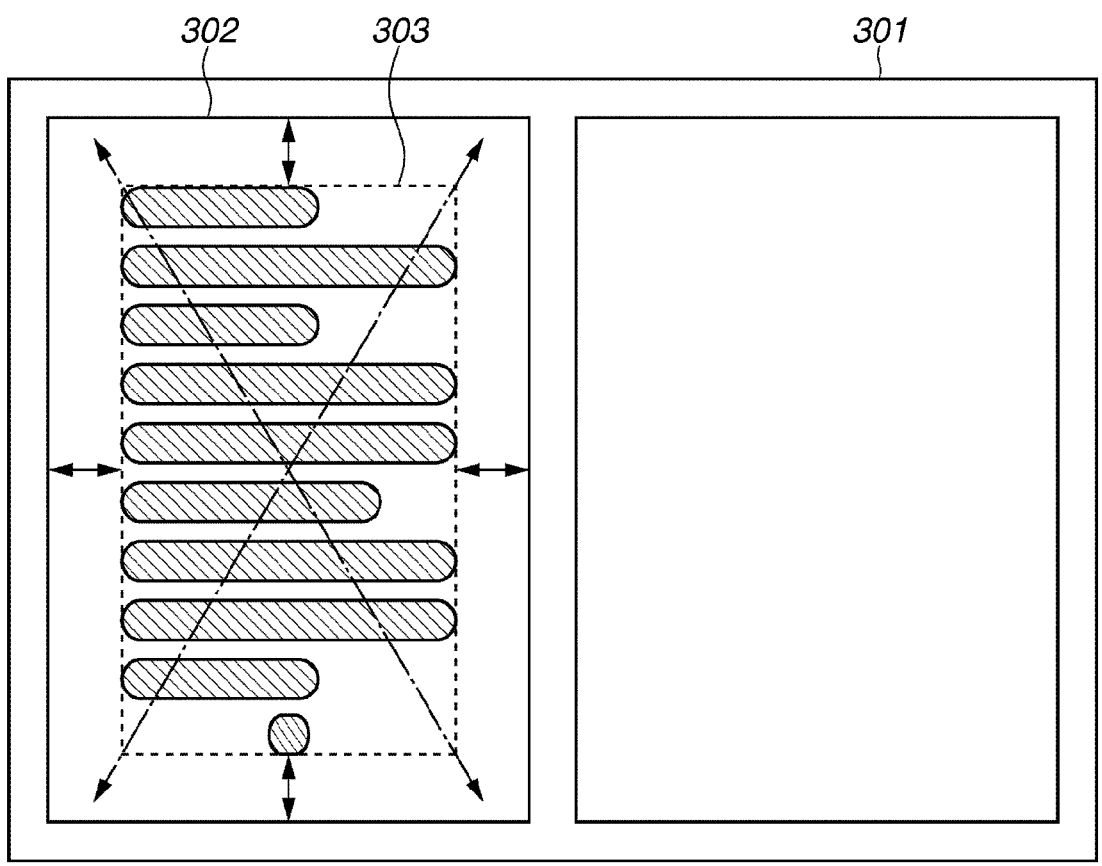
FIG. 4A illustrates an image of N-up printout having a designated magnification rate.
Figure 4B:
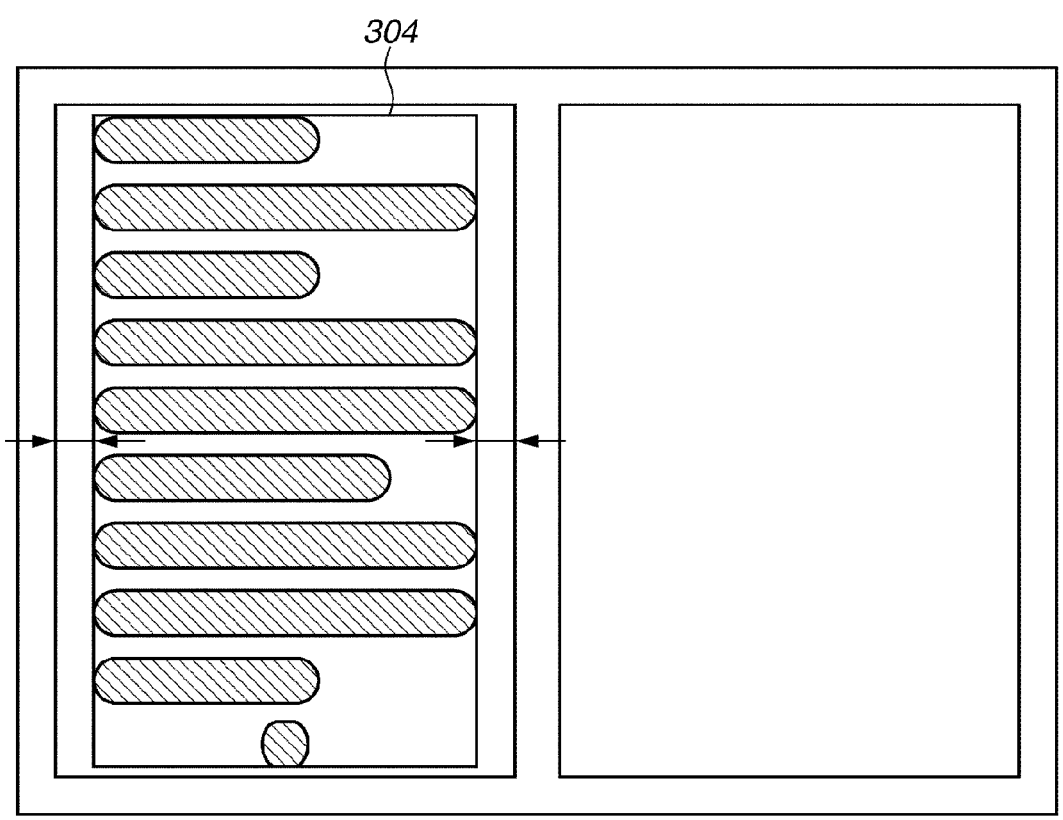
FIG. 4B illustrates an image of N-up printout having a designated magnification rate.

FIG. 4A schematically illustrates an image of 2-up printout without magnification of each page image, and FIG. 4B schematically illustrates an image of 2-up printout with each page image magnified.

For the sake of readability, the following exemplary embodiments for N-up printing will be described based on 2-up printing. However, the exemplary embodiments also apply to 4-up and 6-up printing.

Referring to FIG. 4A, an area 302 arranged on a physical print sheet 301 is used as a printing area for 2-up printing. Then, an image to be laid out in the printing area 302 is reduced from the original size according to a 2-up setting. The page includes the effective image area 303. Referring to FIG. 4B, on the other hand, the effective image area 304 is an image that has been once magnified according to a user-designated magnification rate and then reduced.

Referring to FIG. 4A, there is a large gap between the printing area 302 and the effective image area 303. Although this margin is provided by the user with an intention to improve the appearance and readability on the application 123, the image reduced by N-up printing is made still smaller by the margin.

The space in the printing area can be effectively used by magnifying the image (document page) with a designated magnification rate (for example, 110 to 130%) in steps S107 and S108 in FIG. 5 (described below) before N-up layout.

As a result, text and graphics included in the effective image area 303 in FIG. 4A are magnified like the effective image area 304 in FIG. 4B, improving the readability of the document. Processing described in the exemplary embodiments is intended to obtain a magnified easy-to-read N-up layout output.

Figure 5:
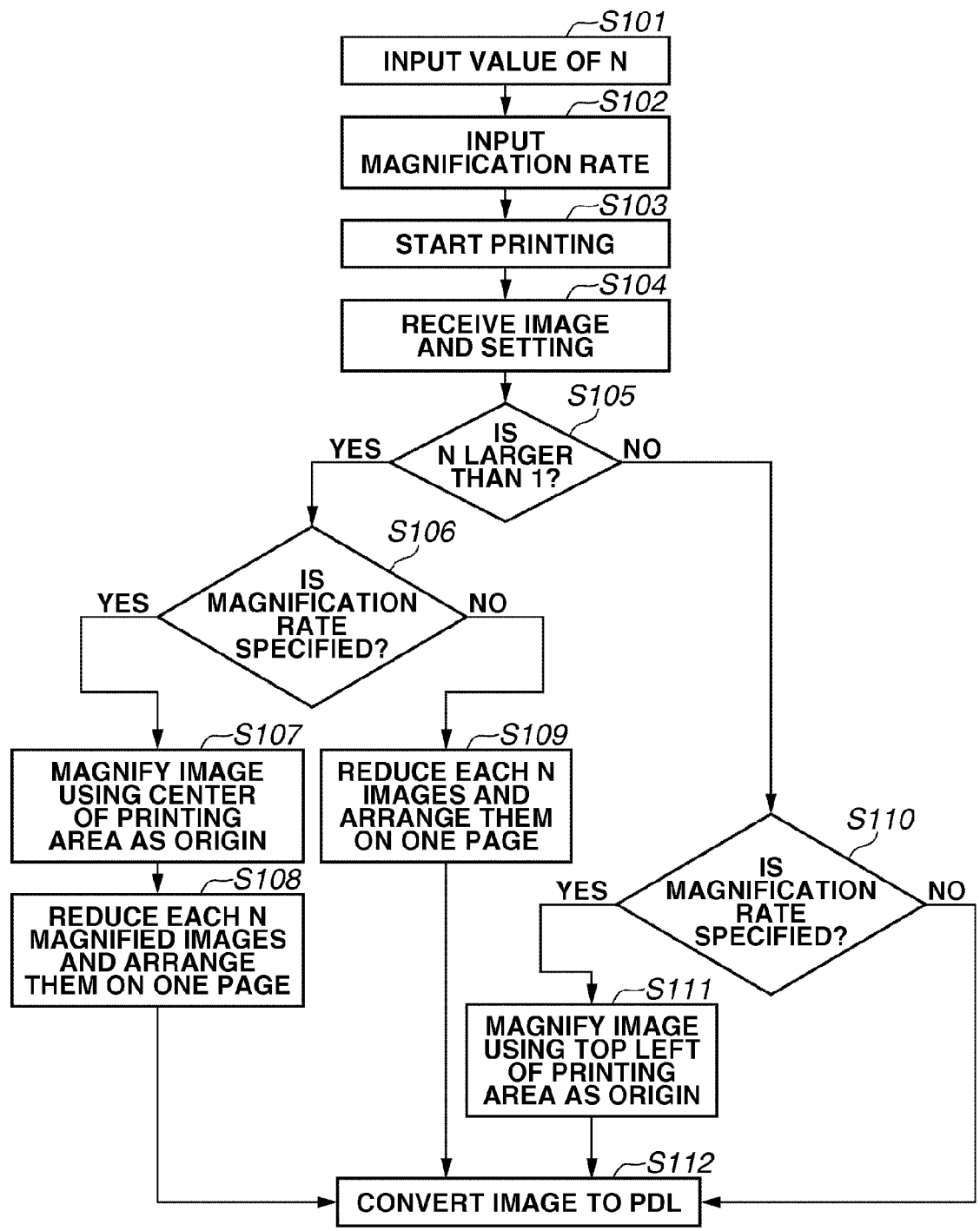
FIG. 5 is a flow chart illustrating exemplary N-up print processing after magnifying an input image with a user-designated magnification rate.

FIG. 5 is a flow chart of N-up print processing after magnifying the image with a user-designated magnification rate. Each step of the flow chart in the present application is implemented when the CPU 111 loads and executes a relevant program.

In steps S101 and S102, the application 123 displays a user interface included in the printer driver 125 to enable the user to input a value of N and a magnification rate for N-up printing, and receives the values input by the user through an input operation. The value of N for N-up printing is the number of images (document pages) to be laid out on one side of a print sheet.

Figure 6A:
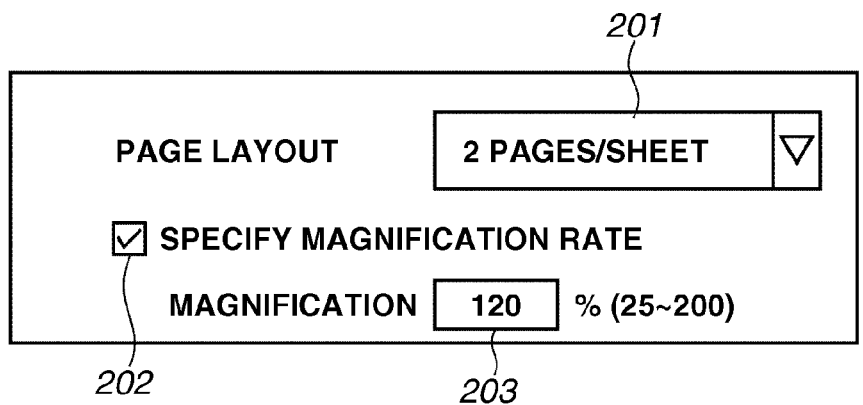
FIG. 6A illustrates an exemplary user interface screen of a printer driver.

FIG. 6A illustrates an exemplary user interface screen through which the user inputs the value of N and magnification rate for N-up printing. In the present application, each of the screens in FIGS. 6A to 6D will be described as a screen provided by the printer driver 125.

The user operates a list box control 201 to select a value of N for N-up printing, such as 1, 2, 4, 6, 8, 9, 16, etc.

When the user turns ON a check box 202 for inputting a setting as to whether a magnification rate is designated by the user, a text box 203 receives the magnification rate.

In step S103, the application 123 receives from the user a printing start command (not illustrated) and then starts document print processing.

When print processing is started, an image is input to the printer driver 125 via the graphic engine 124 as mentioned above.

In step S104, the printer driver 125 receives the input image together with the setting. In step S105, the printer driver 125 determines whether the set value of N is larger than 1.

When N is larger than 1 (YES in step S105), the processing proceeds to step S106. Otherwise (NO in step S105), the processing proceeds to step S110.

In step S106, the printer driver 125 determines whether a magnification rate is designated in the setting. When a magnification rate is designated (YES in step S106), the processing proceeds to step S107. Otherwise (NO in step S106), the processing proceeds to step S109.

In step S107 (when a magnification rate is designated), the printer driver 125 magnifies the received image according to the designated magnification rate. Then, the magnified image is reduced according to a reduction rate based on an N-up printing designation. In step S108, the printer driver 125 performs layout processing so that the images magnified and then reduced are laid out on one side of a print sheet.

In step S109 (when a magnification rate is not designated), the printer driver 125 performs layout processing so that the received image is reduced according to the reduction rate based on a N-up printing designation and laid out on one side of a print sheet.

In step S107, the printer driver 125 magnifies the image by using the center of the printing area 302 as an origin of magnification.

In step S111, the printer driver 125 magnifies the image by using the top left of the printing area 302 as an origin of magnification. However, in step S107, the printer driver 125 magnifies the image by using the center (not the top left) of the printing area 302 as an origin of magnification since the purpose of this magnification processing is to remove the margin at the four corners of the effective image area.

In step S112, the printer driver 125 converts the image having (or not having) undergone layout processing according to the N-up setting to PDL data (print data generation), and outputs the PDL data via the system spooler 126.

The printer driver 125 according to the present exemplary embodiment determines an image size based on an image reduction rate for laying out the input number of images and on the input image magnification rate. Then, the printer driver 125 generates print data with which images having the determined size are laid out on a print sheet. Although images having undergone layout processing according to the N-up setting are converted to PDL data in the present exemplary embodiment, the printer driver 125 may generate such PDL data (PDL before layout processing) that instructs a printer to perform the layout processing. In any case, the printer driver 125 generates such PDL data that outputs a printed material according to a user setting. Although, in the present exemplary embodiment, the printer driver 125 magnifies the image according to the magnification rate and then performs layout processing according to the N-up setting, the processing may be executed in reverse order.

According to the present exemplary embodiment, by enabling the user to designate a magnification rate together with N-up printing, the printer driver 125 removes margins included in the input image to enable totally magnifying the image, thus obtaining an easy-to-read N-up layout output.

Processing according to a second exemplary embodiment will be described below.

With the processing illustrated in the flow chart in FIG. 5, the user inputs an adjusted magnification rate so that the effective image area fits into the printing area.

However, since it is not easy for the user to designate a magnification rate for fitting the effective image area into the printing area, the user may need to print a relevant page several times on a trial-and-error basis to obtain an optimal output.

The second exemplary embodiment will be described below based on processing for magnifying images so that the effective image area automatically fits into the printing area.

Figure 7A:
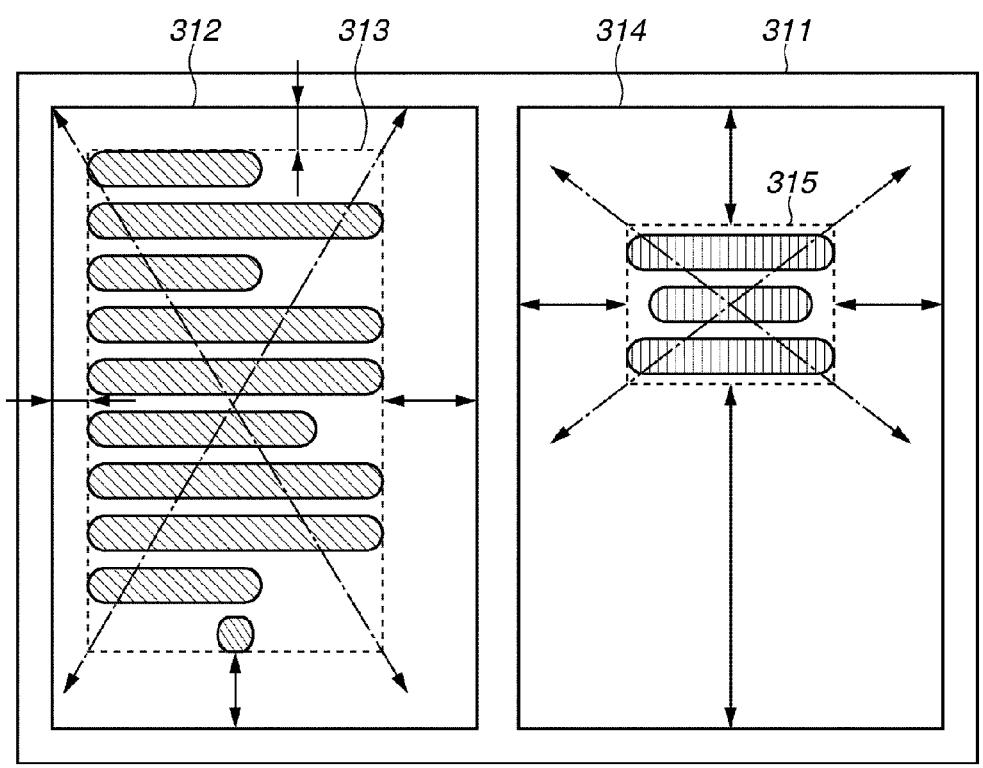
FIG. 7A illustrates an exemplary image of N-up printout.
Figure 7B:
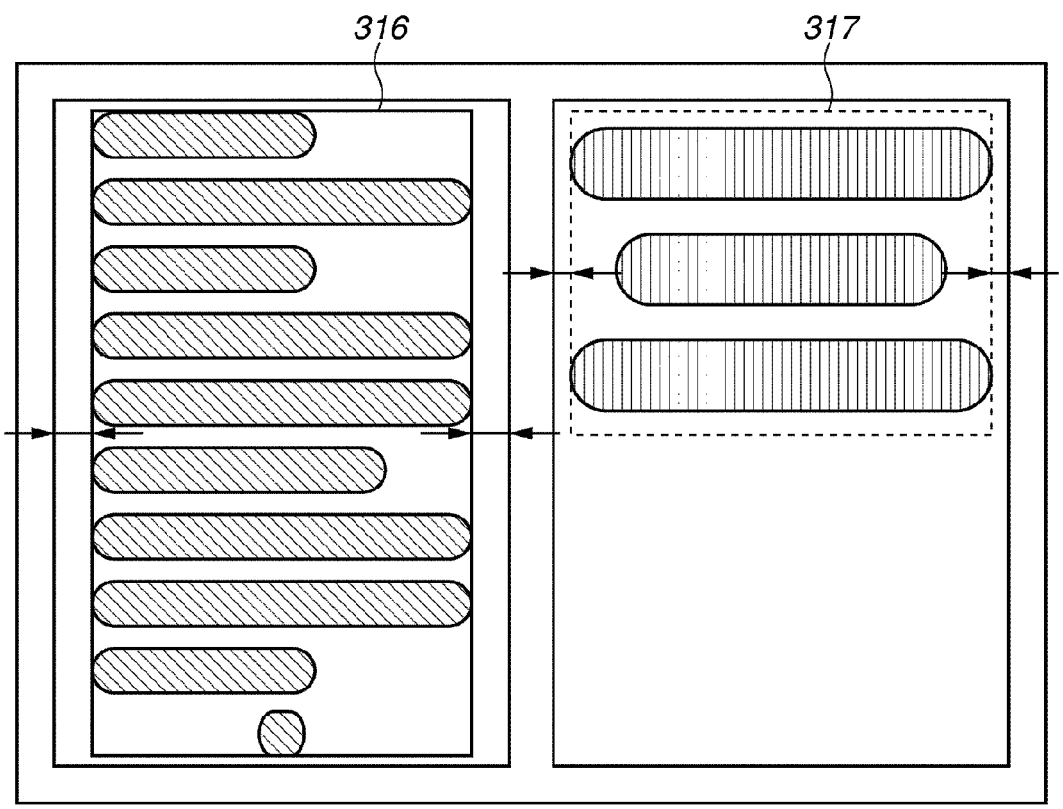
FIG. 7B illustrates an exemplary image of N-up printout.

FIG. 7A schematically illustrates an image of 2-up printout without magnification, and FIG. 7B schematically illustrates an image of 2-up printout with magnification so that the effective image area automatically fits into the printing area.

Referring to FIG. 7A, a print sheet 311 has printing areas 312 and 314 suitable for 2-up layout. The printing areas 312 and 314 include effective image areas 313 and 315, respectively, for two pages.

Referring to FIG. 7B, on the other hand, effective image areas 316 and 317 are magnified so that they automatically fit into respective printing area, and then reduced.

Processing described in the secondary exemplary embodiment is intended to obtain an output using margins in the printing area as much as possible, as illustrated in FIG. 7B.

Processing according to the secondary exemplary embodiment will be described below with reference to the flow chart in FIG. 8.

Figure 6B:
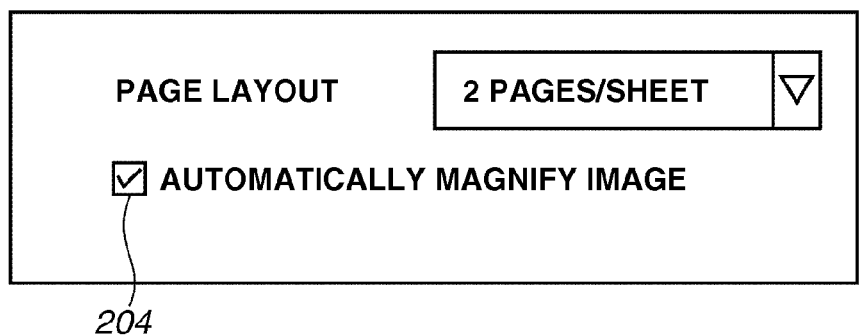
FIG. 6B illustrates an exemplary user interface screen of the printer driver.

In steps S201 and S202, the application 123 displays a user interface included in the printer driver 125 to enable the user to input a value of N and designate whether the image is to be automatically magnified, and receives the value and setting input by the user through an input operation. FIG. 6B illustrates an exemplary user interface screen for enabling the user to input a value of N and designate whether the image is to be automatically magnified.

The user inputs the value of N in a way similar to the user interface screen in FIG. 6A, i.e., by using the list box control 201.

When the user turns ON the check box 202, the printer driver 125 is instructed to automatically magnify the document.

In step S203, the application 123 receives from the user a printing start command (not illustrated) and then starts document print processing.

When print processing is started, an image is input to the printer driver 125 via the graphic engine 124 as mentioned above.

In step S204, the printer driver 125 receives the input image together with the setting. In step S205, the printer driver 125 checks the setting to determine whether the image is to be automatically magnified.

When the image is to be automatically magnified (YES in step S205), the processing proceeds to step S206. Otherwise (NO in step S205), the processing proceeds to step S212.

In step S206 (when the printer driver 125 determines in step S205 that the image is to be automatically magnified), the printer driver 125 renders the image to bitmap data.

The images input to the printer driver 125 are a set of DDI rendering commands as mentioned above.

Although the format of the set of rendering commands does not depend on a specific output resolution, it is not suitable for analyzing output positions of text and graphics.

Therefore, after converting the image to the bitmap format suitable for such analysis, the processing proceeds to step S207 (described below).

The graphic engine 124 is used to convert the set of rendering commands to the bitmap format.

More specifically, the printer driver 125 instructs an API provided by the graphic engine 124 to designate a bitmap area allocated on the RAM 139 as an output destination and output DDI rendering commands. Thus, desired data of the bitmap format can be obtained.

Since the bitmap data used for the analysis in step S207 requires only monochrome binary image information and does not require color information, the printer driver 125 instructs the graphic engine 124 to output monochrome binary bitmap image data in advance.

Performing processing in this way can reduce the size of the bitmap area allocated in the RAM 139, thus improving the efficiency of processing.

In step S207, the printer driver 125 analyzes the bitmap data obtained in step S206 to detect edges and determine an effective image area.

Figure 9:
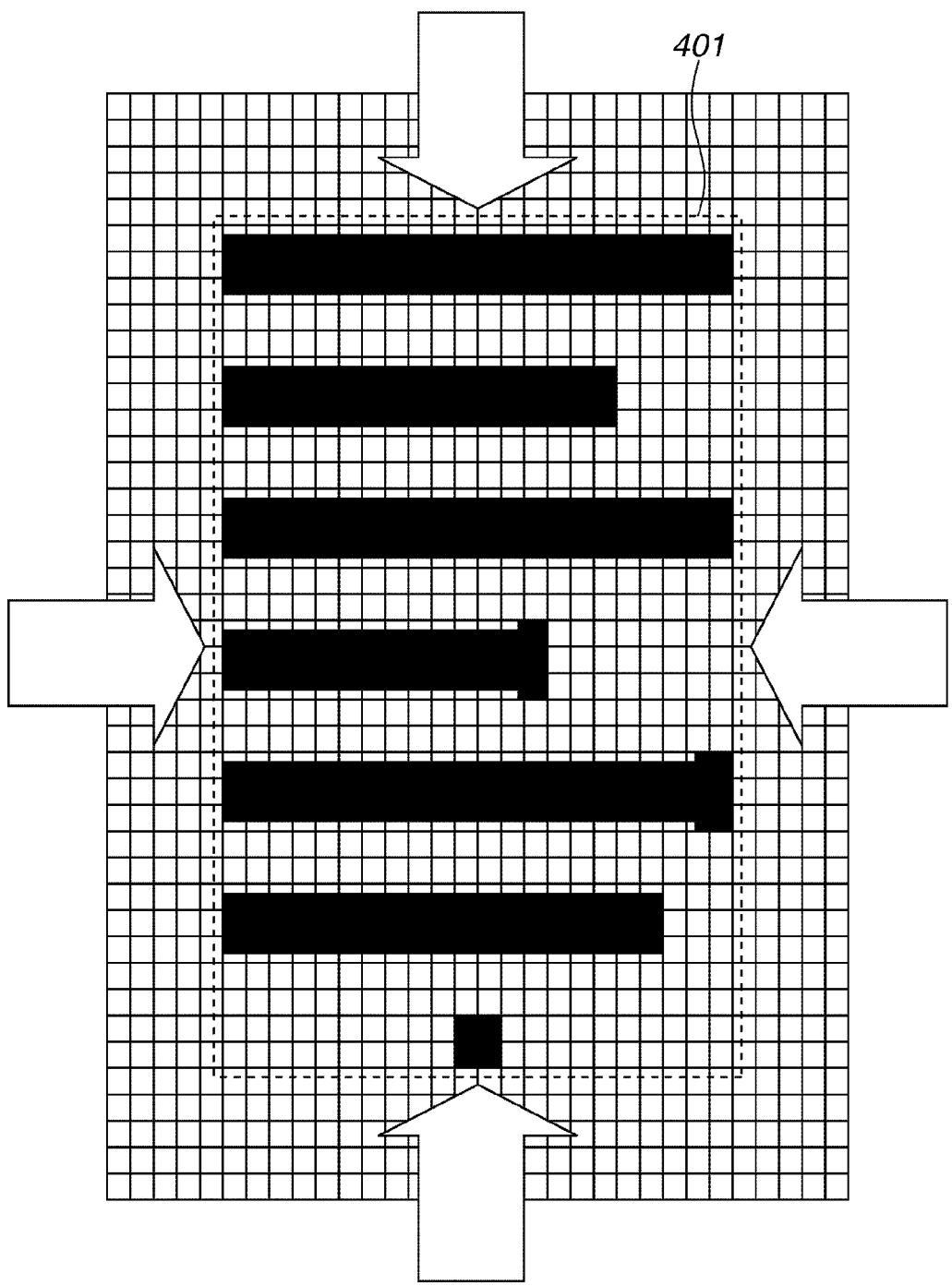
FIG. 9 illustrates exemplary processing for detecting edges of an effective image area.

FIG. 9 illustrates processing for detecting edges and determining an effective image area.

The effective image area refers to a circumscribed quadrangle area 401 in FIG. 9 surrounded by the four sides contacting effective pixels on the bitmap data with marginal areas excluded from images.

The printer driver 125 extracts one row (one column) from the outermost side of each of the four sides of the bitmap data, and checks whether an effective pixel is included in the extracted row (column).

When at least one effective pixel is included in the extracted row (column), the printer driver 125 determines the position of the row (column) as an edge. When no effective pixel is included in the row (column), the printer driver 125 repeats processing for extracting and checking a following one row (column) until an effective pixel appears.

In step S208, the printer driver 125 calculates the fit magnification rate from the effective image area determined in this way and the printing area for the output page.

The fit magnification rate refers to a magnification rate for fitting the effective image area into the printing area, i.e., the image is magnified while maintaining an aspect ratio of the effective image area not to exceed the width or height of the printing area.

In step S209, the printer driver 125 applies the fit magnification rate calculated in step S208 to the image to magnify and move it.

Since the magnification processing of step S209 is intended to fit the image into the printing area, the position of the image used as an origin of magnification does not matter. The printer driver 125 moves the magnified image so that it fits into the printing area.

When a margin is subsequently generated on the right or left side (top or bottom side) by a difference in aspect ratio between the printing area and the image, the printer driver 125 may move the magnified image to the top left of the printing area or place it at the center thereof to make margins on the right and left sides (top and bottom sides) even.

Alternatively, to minimize a difference in appearance between images before and after magnification, the printer driver 125 may apply the fit magnification rate to the image by using the center of the printing area as an origin to magnify it in a similar way to step S107, and, only when the image overflows the printing area, move the image so that it fits into the printing area.

In step S210, the printer driver 125 determines whether the value of N is larger than 1. When the value of N is larger than 1 (YES in step S210), the processing proceeds to step S211. Otherwise (NO in step S210), the processing proceeds to step S214.

Descriptions of processing of step S211 will be omitted since it is similar to the processing of step S108.

In step S212 (when the printer driver 125 determines in step S205 that the image is not to be automatically magnified), the printer driver 125 determines whether N is larger than 1. When N is larger than 1 (YES in step S212), the processing proceeds to step S213. In step S213, the printer driver 125 reduces N images and performs N-up layout. Otherwise (NO in step S212), the processing proceeds to step S214.

In step S214, the printer driver 125 converts the image having (or not having) undergone N-up layout processing to PDL data, and outputs the PDL data via the system spooler 126 (print data generation).

The secondary exemplary embodiment has specifically been described based on processing for magnifying the image so that the effective image area fits into the printing area without designating magnification rate by the user.

This processing enables automatically obtaining a magnified easy-to-read N-up layout output.

Processing according to a third exemplary embodiment will be described below.

Although, in the second exemplary embodiment, the image is automatically magnified so that the effective image area fits the printing area, the magnification rate also differs for each image as illustrated in FIG. 7B when the margin between the effective image area and the printing area differs in size for each image. Therefore, a feeling of unified text sizes, etc. will be lost.

Figure 7C:
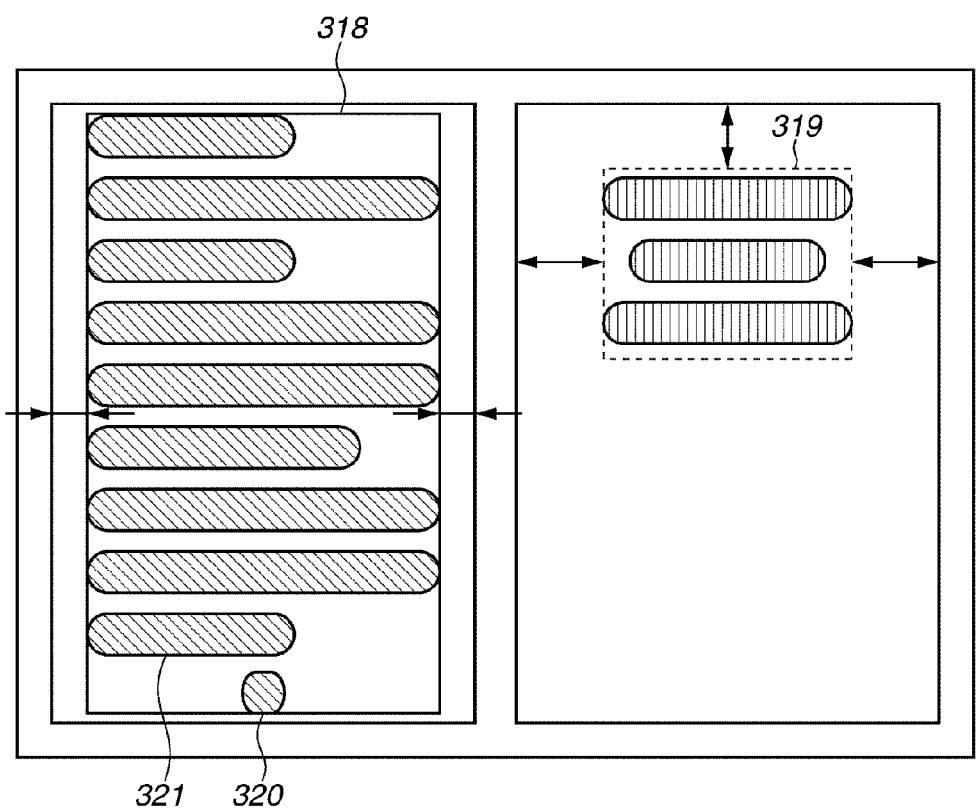
FIG. 7C illustrates an exemplary image of N-up printout.

FIG. 7C schematically illustrates a 2-up output image having a unified magnification rate for images included in the page.

When comparing the 2-up output image in FIG. 7C with the 2-up output image in FIG. 7B without unifying the magnification rate according to the secondary exemplary embodiment, the magnification rate for an image 319 in FIG. 7C is smaller than that of the image 317 in FIG. 7B.

This is because the printer driver 125 calculates a magnification rate for fitting the left-hand side effective image area 313 into the printing area 312 and a magnification rate for fitting the right-hand side effective image area 315 into the printing area 314 to obtain the image in FIG. 7C, and then magnifies the image by using the smaller magnification rate.

Processing described in the third exemplary embodiment is intended to obtain an output having a feeling of unified image appearances. More specifically, the printer driver 125 magnifies all images based on a minimum magnification rate out of fit magnification rates for all images to be laid out on one side of an identical print sheet, as illustrated in FIG. 7C.

Processing according to the third exemplary embodiment will be described below with reference to the flow chart in FIG. 10.

Figure 10B:
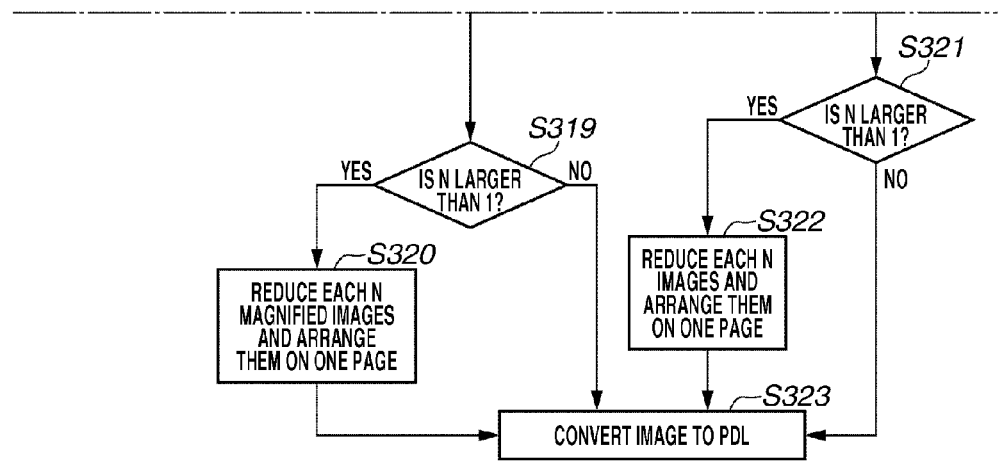
FIG. 10 is a flow chart illustrating exemplary processing for unifying the magnification rate within a page.

In the third exemplary embodiment, the processing of steps S301 to S305 in FIG. 10 is similar to the processing of steps S201 to S204.

However, the former processing differs from the latter processing in processing for inputting a setting for unifying the magnification rate within a page in step S303. Step S303 will be described below.

Figure 6C:
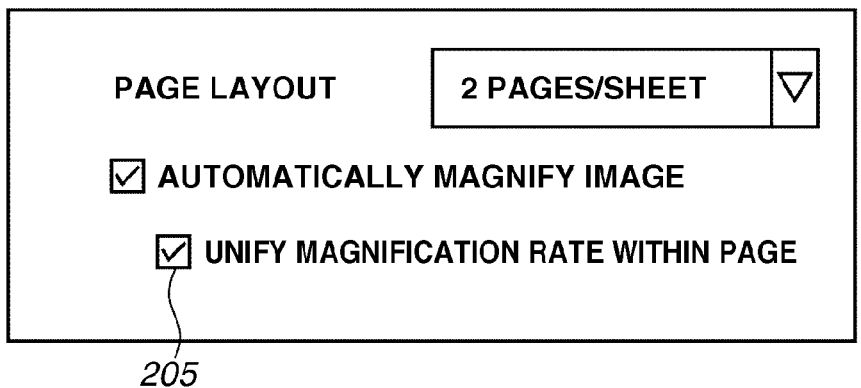
FIG. 6C illustrates an exemplary user interface screen of the printer driver.

FIG. 6C illustrates an exemplary user interface screen having a method for inputting a setting as to whether the magnification rate is unified within a page.

When the user turns ON a check box 205, the magnification rate is unified for N images to be laid out on one side of a print sheet, providing a feeling of unified image appearances within the page. Specifically, the printer driver 125 receives a setting as to whether the user checks the check box 205 to designate the unification of magnification rate for N images to be laid out on a print sheet.

In step S306, the printer driver 125 checks the input setting to determine whether the image is to be automatically magnified.

When the printer driver 125 determines that the image is to be automatically magnified (YES in step S306), the processing proceeds to step S307. Otherwise (NO in step S306), the processing proceeds to step S321.

In step S307 (when the image is to be automatically magnified), the printer driver 125 further checks the setting to determine whether the magnification rate is to be unified within a page.

When the printer driver 125 determines that the magnification rate is to be magnified within a page (YES in step S307), the processing proceeds to step S308. Otherwise (NO in step S307), the processing proceeds to step S316.

Then, the printer driver 125 repeats a loop processing of steps S308 to S315 for the first to M-th images (M denotes the total number of input images).

In step S309, before starting the loop processing, the printer driver 125 initializes the value of the fit magnification rate X common in the page to a very large number (0xFFFF which is the maximum value of a 2-byte unsigned integer).

The printer driver 125 selects a minimum value out of fit magnification rates for N images as the common fit magnification rate X.

X is initialized to a very large number because of this reason.

Then, the processing proceeds to step S310. In step S310, the printer driver 125 repeats processing of steps S310 to S313 for the first to N-th images (N denotes the value of N for N-up printing) out of M images.

At the beginning of the processing of steps S310 to S313, the printer driver 125 performs the following processing for a certain image out of N images. In step S206, the printer driver 125 renders the above-mentioned bitmap data. In step S207, the printer driver 125 detects edges to determine an effective image area. In step S208, the printer driver 125 calculates the fit magnification rate from the printing area and effective image area.

As a result, a fit magnification rate A is calculated for a certain image.

In step S311, the printer driver 125 determines whether A is smaller than X. When A is smaller than X (YES in step S311), the processing proceeds to step S312. In step S312, the printer driver 125 sets A to X, i.e., assigns the value of A to X). Otherwise (NO in step S311), the processing proceeds to step S313 (loop end).

In S313, the printer driver 125 determines whether the processing is completed for N images. When the processing is not completed, the processing returns to step S310 (loop top). Otherwise, when the processing is completed, the processing proceeds to step S314.

In step S314, the printer driver 125 applies the minimum fit magnification rate X obtained from the loop processing of steps S310 to S313 to N images to magnify them.

In step S315, the printer driver 125 determines whether the processing is completed for M images. When the processing is not completed, the processing returns to step S308 (loop top). Otherwise, when the processing is completed, the processing proceeds to step S319.

As a result of the processing of step S308, M images are magnified as large as possible with the magnification rate unified in unit of N images.

In another loop processing of steps S316 to S318 without unifying the magnification rate within a page, M images are magnified so that each image fits into each printing area to maximum extent.

The processing of steps S316 to S318 is similar to the above-mentioned processing of steps S308, S314, and S315, and therefore descriptions will be omitted.

Further, the processing of steps S319 to S320 is similar to the processing of steps S105 and S108, and therefore descriptions will be omitted.

Otherwise, when the printer driver 125 determines that the image is not to be automatically magnified (NO in step S306), the processing proceeds to steps S321 and S322. The processing of these steps is similar to the processing of steps S212 and S213, and therefore descriptions will be omitted.

In step S323, the printer driver 125 converts the input image to PDL data and outputs the PDL data via the system spooler 126.

The third exemplary embodiment has specifically been described based on the processing for applying the minimum fit magnification rate out of magnification rates for images included in a page to all images.

This processing enables the image to automatically fit into the printing area with the magnification rate for N images laid out on one side of a print sheet unified according to the N-up setting, thus providing a feeling of unified image appearances. Although, in the above-mentioned processing, the magnification rate is unified in unit of N images to be laid out on one side of a print sheet, the magnification rate may be unified for M images on all pages included in the print data. More specifically, with a screen as illustrated in FIG. 6C, the printer driver 125 receives a user setting through a check box "UNIFY MAGNIFICATION RATE WITHIN PAGE" displayed in addition to or instead of the check box 205. When the printer driver 125 receives a user setting that the check box "UNIFY MAGNIFICATION RATE WITHIN PAGE" is checked, the printer driver 125 selects a minimum magnification rate out of fit magnification rates for all images included in all pages.

Processing according to a fourth exemplary embodiment will be described below.

In many cases, print data has a page number and title laid out at the header and footer positions.

When outputting print data as a handout, it is important that these pieces of information are properly printed on output materials. However, these pieces of information may not be necessary if a material is output, for example, only for the purpose of personal document check.

FIG. 7C schematically illustrates text rendering of a page number 320 laid out at the footer position of print data.

Assume that the user thinks the page number 320 unnecessary and removes it, a text 321 comes to the bottom end of an effective image area 318. As a result, the occupation rate of the effective image area 318 to the printing area 312 decreases and accordingly a room for further magnification is generated. This makes it possible to apply a larger magnification rate to further magnify text and graphics as illustrated in FIG. 7D.

Figure 7D:
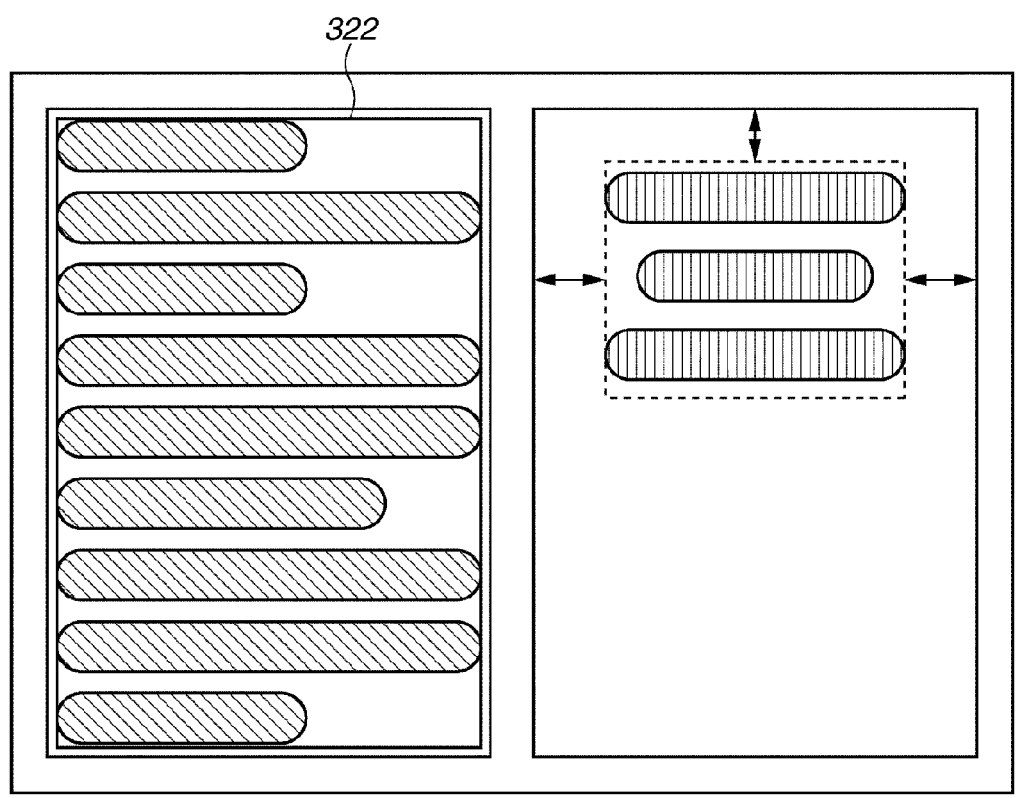
FIG. 7D illustrates an exemplary image of N-up printout.

Processing described in the fourth exemplary embodiment is intended to further magnify the image by deleting auxiliary rendering information at the header and footer positions and to the right and left of the image as illustrated in FIG. 7D.

Figure 6D:
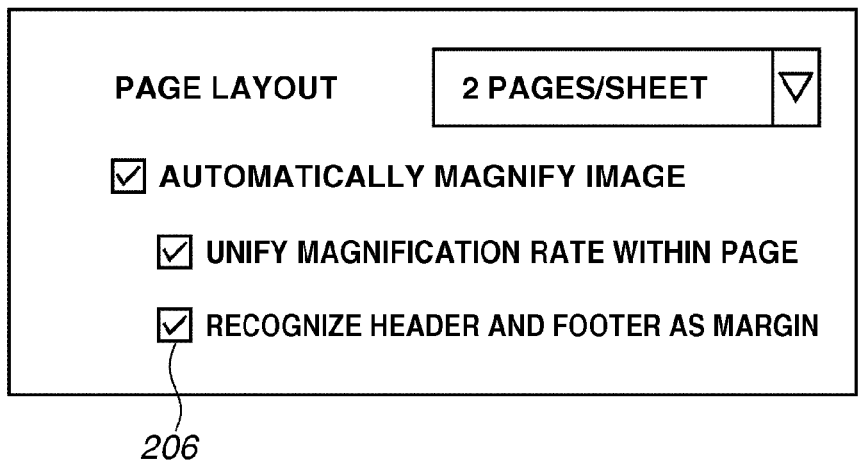
FIG. 6D illustrates an exemplary user interface screen of the printer driver.

FIG. 6D illustrates an exemplary user interface screen of the printer driver 125 for applying processing according to the present exemplary embodiment.

When the user turns ON a check box 206, the processing executes steps S401 to S409 (described below) as denoted by "RECOGNIZE HEADER AND FOOTER AS MARGIN." Otherwise, when the user turns OFF the check box 206, the processing does not execute steps S401 to S409 (described below).

Processing according to the fourth exemplary embodiment will be described below with reference to the flow chart in FIG. 11.

This processing substitutes for the processing for detecting edges of the input image to determine an effective image area, described above in step S207.

In S207, the printer driver 125 checks each of the four sides of the image from the outermost side thereof, and recognizes an effective pixel position (a position where an effective pixel appears) as an edge.

On the other hand, in processing according to the present exemplary embodiment, the printer driver 125 does not unconditionally recognize an effective pixel position as an edge but recognizes it as an edge only when a certain condition is met.

In step S206, the printer driver 125 renders the input image to bitmap data, and the processing proceeds to step S401.

Then, the printer driver 125 repeats processing of steps S401 to S409 a desired number of times (Y times) for each of the four sides of the image to determine a circumscribed quadrangle of the effective image area.

Specifically, the printer driver 125 performs the processing for the top, right, bottom, and left sides, for example. The printer driver 125 performs this sequence Y times.

The printer driver 125 repeats the sequence in this way because a result of a certain sequence may possibly affect the processing of the following sequence.

At the beginning of the processing of steps S401 to S409, the printer driver 125 performs the following processing. In step S402, the printer driver 125 extracts one row (column) from the outermost side of the currently concerned side.

In step S403, the printer driver 125 detects all pixels included in the extracted row (column). In step S404, the printer driver 125 determines whether at least one pixel is included in the row (column).

When at least one pixel is included in the row (column) (YES in step S404), the processing proceeds to step S405. Otherwise, when no pixel is included in the row (column) (NO in step S404), the processing returns to step S402 to extract the following row (column).

In step S405, the printer driver 125 connects two pixels within a fixed distance therebetween with a line segment. A set of connected pixels is recognized as a group and a line segment connecting such pixels is referred to as a group line segment.

Figure 12:
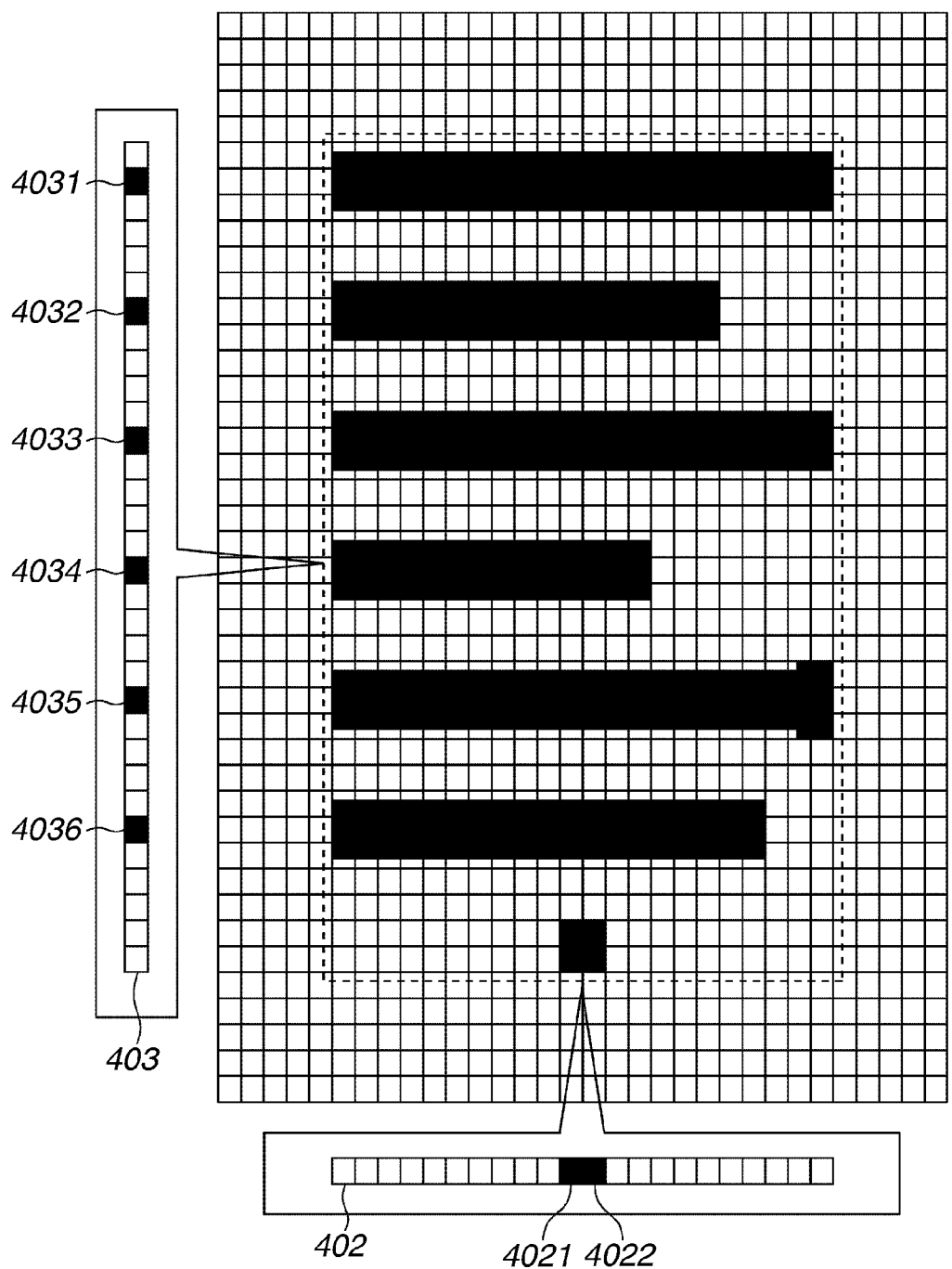
FIG. 12 illustrates processing for determining an edge of the effective image area by recognizing a header and footer as a margin.

FIG. 12 illustrates edge detection processing according to the present exemplary embodiment.

FIG. 12 illustrates a bottom row 402 in which an effective pixel is determined to appear first in step S404 out of rows extracted from the bottom of the image. FIG. 12 also illustrates a leftmost column 403 in which an effective pixel is determined to appear first in step S404 out of columns extracted from the left end of the image.

Referring to FIG. 12, the row 402 includes two adjacent pixels 4021 and 4022 and the column 403 includes six pixels 4031 to 4036.

In step S405, the printer driver 125 sequentially extracts two pixels included in the row 402 (column 403) from the bottom (left end). When the distance between the two pixels is within a fixed value, the printer driver 125 connects them with a virtual line segment to group them.

In the present exemplary embodiment, a line segment connecting pixels in this way is referred to as a group line segment.

For example, when a line segment connecting pixels having a distance of up to 5 (pixels) therebetween is set to be recognized as a group line segment, a line segment connecting the pixels 4021 and 4022 of the row 402 is recognized as a group line segment.

On the other hand, any two adjacent pixels of the pixels 4031 to 4036 included in the column 403 have a distance of up to 5 (pixels) therebetween. Accordingly, a long line segment connecting the pixels 4031 to 4036 and including all pixels therebetween is recognized as a group line segment.

In step S406, the printer driver 125 calculates a ratio of the total length of determined group line segments to the length of the row (column) as a density.

The density defined here is an index for representing how much rendering information is included in the currently concerned row (column).

In step S407, the printer driver 125 determines whether the calculated density exceeds a reference ratio (threshold value). When the calculated density exceeds the threshold value (YES in step S407), the printer driver 125 stops the processing for excluding marginal areas from the image, and the processing proceeds to step S408. In step S408, the printer driver 125 recognizes the currently concerned row (column) as an edge. When the calculated density does not exceed the threshold value (NO in step S407), the printer driver 125 does not recognize the row (column) as an edge, and the processing returns to step S402 to extract the following row (column).

Suppose that a reference ratio of 30% is used for the comparison in step S407. The row 402 has a length of 22 and a total group-line-segment length of 2, resulting in a density of 10%. Since this density does not exceed the reference ratio, the printer driver 125 does not recognize the row 402 as an edge, and the processing returns to step S402 to extract the following row.

On the other hand, the column 403 has a length of 32 and a total group-line-segment length of 26, resulting in a density of more than 80%. Since this density exceeds the reference ratio, the printer driver 125 recognizes the column 403 as an edge.

The reference ratio (threshold value) may be a predetermined value or a value stored in the external storage 121 that can be changed as required.

Rendering information such as a page number at the footer position is excluded from the effective image area and recognized as a margin. Rendering information such as a top row in the document text is included in the effective image area.

The printer driver 125 repeats the processing of steps S401 to S409 Y times because whether a certain row (column) is recognized as an edge affects the length of an adjacent column (row) itself.

For example, as a result of the processing of steps S402 to S407 for the bottom end of the image, the printer driver 125 determines as an edge a row at an inward (upward) position having a distance of 4 (pixels) from the row 402 in FIG. 12.

Taking this result into account, the printer driver 125 extracts a column from the outermost side of the left end of the image. A portion of the column 403 below the bottom end of the image is not subjected to processing and therefore may be excluded. As a result, the length of the column 403 is shorter than the illustration in FIG. 12 by 4 (pixels).

Since the result of the processing of steps S402 to S407 affects the result of following processing of steps S402 to S407, the printer driver 125 repeats the processing a plurality of times (Y times) until the effect can be ignored.

An optimal value of the number of repetitions (Y) depends on pixel arrangements and therefore cannot be simply determined. However, since the effect of the processing result almost disappears with Y=2 or 3, these values are preselected in actual processing.

In step S208, the printer driver 125 calculates the fit magnification rate from the effective image area determined in this way and the printing area of the page.

The fourth exemplary embodiment has specifically been described based on the processing for obtaining a larger fit magnification rate by removing auxiliary rendering information at the header and footer positions, etc.

This processing enables automatically obtaining a magnified easy-to-read N-up layout output.

The present exemplary embodiment has specifically been described based on a case where the printer driver 125 deletes auxiliary rendering information at the header and footer positions, etc. according to a user setting input through an interface screen. However, the printer driver 125 may delete the auxiliary rendering information at either the header or footer position according to a user setting input through an interface screen. More specifically, the printer driver 125 receives a user setting through check boxes such as "RECOGNIZE HEADER AS MARGIN" and "RECOGNIZE FOOTER AS MARGIN" in addition to (or instead of) the check box 206 in the screen in FIG. 6D. When the printer driver 125 receives a user setting that "RECOGNIZE HEADER AS MARGIN" or "RECOGNIZE FOOTER AS MARGIN" is checked, it deletes the auxiliary rendering information at the header or footer position.

The present invention is effective also in a fifth exemplary embodiment (described below), and similar effects to the above-mentioned exemplary embodiments can be obtained.

Although, in the above-mentioned descriptions, relevant processing is implemented in the printer driver 125 on the host computer 101, similar processing may be implemented in the output device 102.

Although, in the above-mentioned descriptions, a digital multifunction peripheral is employed as the output device 102, it may be an output device of other type, such as an ink-jet output device.

Although, in the above-mentioned descriptions, the processing is performed in a process of printing electronic print data, the processing may be performed in a process of scanning paper data through a scanner and outputting a copy.

According to the present invention, it becomes possible to provide a N-up printing function for making a document easy to read while maintaining a user-designated N-up layout.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-011400 filed Jan. 21, 2010, which is hereby incorporated by reference herein in its entirety.

What is claimed is:

1. An information processing apparatus for generating a print job based on a page image, the information processing apparatus comprising:
   an input unit configured to input the number of pages to be laid out on one side of a print sheet;
   a determination unit configured to determine a printing area where each page image is to be laid out based on the number of pages input by the input unit;
   an identification unit configured to identify an image area excluding margins from the page image;
   a magnification unit configured to magnify the image area so that it may not exceed the printing area based on the image area identified by the identification unit and the printing area determined by the determination unit;
   and a designation unit configured to designate a unification of magnification rate for a plurality of pages to be laid out on one side of a print sheet, wherein, when the unification of magnification rate is designated, the magnification unit applies a minimum magnification rate out of image area magnification rates on each page to the image area on each page so that a uniform magnification rate is applied to all of the pages on one side of the print sheet.

2. The information processing apparatus according to claim 1, wherein the designation unit designates whether or not a header and a footer are to be recognized as a margin.

3. The information processing apparatus according to claim 1, wherein the designation unit designates the unification of magnification rate according to an instruction input via a setting screen provided by a printer driver generating the print job.

4. A control method performed by an information processing apparatus for generating a print job based on a page image, the control method comprising:
- inputting the number of pages to be laid out on one side of a print sheet;
- determining a printing area where each page image is to be laid out based on the input number of pages;
- identifying an image area excluding margins from the page image;
- magnifying the image area so that it does not exceed the printing area based on the identified image area and the determined printing area;
- and designating a unification of magnification rate for a plurality of pages to be laid out on one side of a print sheet,
- wherein, when the unification of magnification rate is designated, a minimum magnification rate out of image area magnification rates on each page to the image area on each page is applied so that a uniform magnification rate is applied to all of the pages on one side of the print sheet.

5. A non-transitory storage medium storing a program executed by an information processing apparatus for generating a print job based on a page image, the program instructing the information processing apparatus to perform a control method comprising:
- inputting the number of pages to be laid out on one side of a print sheet;
- determining a printing area where each page image is to be laid out based on the input number of pages;
- identifying an image area excluding margins from the page image;
- magnifying the image area so that it does not exceed the printing area based on the identified image area and the determined printing area;
- and designating a unification of magnification rate for a plurality of pages to be laid out on one side of a print sheet, and
- wherein, when the unification of magnification rate is designated, a minimum magnification rate out of image area magnification rates on each page is applied to the image area on each page so that a uniform magnification rate is applied to all of the pages on one side of the print sheet.

* * * * *